United States Patent
Smyth et al.

(10) Patent No.: US 11,192,828 B2
(45) Date of Patent: *Dec. 7, 2021

(54) MACHINABLE COATINGS FABRICATED BY SLURRY METHODS FOR USE ON CERAMIC MATRIX COMPOSITES

(71) Applicant: Raytheon Technologies Corporation, Farmington, CT (US)

(72) Inventors: Imelda P. Smyth, North Palm Beach, FL (US); Xia Tang, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 33 days.

This patent is subject to a terminal disclaimer.

(21) Appl. No.: 16/542,835

(22) Filed: Aug. 16, 2019

(65) Prior Publication Data

US 2020/0157963 A1 May 21, 2020

Related U.S. Application Data

(60) Provisional application No. 62/764,907, filed on Aug. 16, 2018.

(51) Int. Cl.
*F01D 11/08* (2006.01)
*F01D 25/24* (2006.01)
*C04B 41/85* (2006.01)

(52) U.S. Cl.
CPC .............. *C04B 41/85* (2013.01); *F01D 11/08* (2013.01); *F05D 2220/32* (2013.01);
(Continued)

(58) Field of Classification Search
CPC ........ F01D 11/08; F01D 11/122; F01D 5/284; F01D 25/246; F01D 2220/32;
(Continued)

(56) References Cited

U.S. PATENT DOCUMENTS 7,686,990 B2  3/2010  Gray
8,124,252 B2 * 2/2012  Cybulsky ................ C04B 41/89
                                              428/701
(Continued)

FOREIGN PATENT DOCUMENTS

JP  2006143553 A  6/2006
JP  2008308374 A  12/2008

OTHER PUBLICATIONS

Machine Translation of JP2008308374 [retrieved on Mar. 25, 2021], Retrieved from: Espacenet. (Year: 2021).*

(Continued)

*Primary Examiner* — J. Todd Newton
*Assistant Examiner* — Eric J Zamora Alvarez
(74) *Attorney, Agent, or Firm* — Bachman & LaPointe, P.C.

(57) ABSTRACT

A blade outer air seal has at least one internal surface and a layer atop the at least one internal surface. The layer has: a matrix comprising at least one of hafnium silicate ($HfSiO_4$) and zirconium silicate ($ZrSiO_4$), ytterbium disilicate ($Yb_2Si_2O_7$); and barium magnesium alumino silicate (BMAS) or other alkaline earth aluminosilicate.

14 Claims, 4 Drawing Sheets

(52) U.S. Cl.
CPC ...... *F05D 2230/90* (2013.01); *F05D 2240/55* (2013.01); *F05D 2300/6033* (2013.01)

(58) Field of Classification Search
CPC ............. F01D 2230/90; F01D 2240/55; F01D 2240/11; F01D 2300/211; F01D 2300/6033; C23C 28/042; C23C 30/00; C23C 28/044; C04B 41/52; C04B 35/806; C04B 41/5024; C04B 35/565; C04B 41/5042; C04B 41/5035; C04B 35/00; C04B 35/803; B05D 2203/30; B05D 2259/00; B05D 7/22; B32B 18/00; Y10T 29/49245
See application file for complete search history.

(56) References Cited

U.S. PATENT DOCUMENTS

| | | | |
|---|---|---|---|
| 9,447,503 B2* | 9/2016 | Tholen | B28B 3/00 |
| 2011/0219775 A1 | 9/2011 | Jarmon et al. | |
| 2012/0236899 A1 | 9/2012 | Subramanian et al. | |
| 2012/0308836 A1 | 12/2012 | Sheedy et al. | |
| 2016/0214907 A1 | 7/2016 | Shim et al. | |
| 2016/0215645 A1 | 7/2016 | McCaffrey | |
| 2016/0245108 A1 | 8/2016 | Sippel et al. | |
| 2016/0281513 A1 | 9/2016 | Kirby | |
| 2016/0332922 A1 | 11/2016 | Tang et al. | |
| 2017/0167279 A1* | 6/2017 | Kirby | C04B 41/52 |
| 2017/0313629 A1 | 11/2017 | Shim et al. | |
| 2017/0350268 A1 | 12/2017 | McCaffrey | |
| 2020/0055789 A1 | 2/2020 | Smyth | |

OTHER PUBLICATIONS

European Search Report dated Dec. 17, 2019 for European Patent Application No. 19191003.3.
U.S. Non-Final Office Action dated Dec. 29, 2020 for related U.S. Appl. No. 16/515,488.
European Search Report dated Dec. 17, 2019 for European Patent Application No. 19192116.2.

* cited by examiner

MACHINABLE COATINGS FABRICATED BY SLURRY METHODS FOR USE ON CERAMIC MATRIX COMPOSITES

CROSS REFERENCE TO RELATED APPLICATION

This application claims the benefit of provisional application Ser. No. 62/764,907, filed Aug. 16, 2018.

BACKGROUND

The disclosure relates to ceramic matrix composite (CMC) components. More particularly, the disclosure relates to coatings for CMC components.

Gas turbine engines typically include a compressor section, a combustor section, and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other loads.

The compressor and turbine sections of a gas turbine engine include alternating rows of rotating blades and stationary vanes. The turbine blades rotate and extract energy from the hot combustion gases that are communicated through the gas turbine engine. The turbine vanes direct the hot combustion gases at a preferred angle of entry into a downstream row of blades. An engine case of an engine static structure may include one or more blade outer air seals (BOAS), which are typically formed of metal, that establish an outer radial flow path boundary for channeling the hot combustion gases.

United States Patent Application Publication 20170350268 A1 (the '268 publication), of McCaffrey, published Dec. 7, 2017, discloses a ceramic matrix composite blade outer air seal segment. The disclosure of the '268 publication is incorporated by reference in its entirety herein as if set forth at length.

United States Patent Application Publication 20160215645 A1 (the '645 publication), of McCaffrey, published Jul. 28, 2016, discloses a ceramic matrix composite blade outer air seal segment. The disclosure of the '645 publication is incorporated by reference in its entirety herein as if set forth at length.

United States Patent Application Publication 20110219775 A1 (the '775 publication), of Jarmon, et al., published Sep. 15, 2011, discloses ceramic matrix composite materials with a sprayed hard coating. The disclosure of the '775 publication is incorporated by reference in its entirety herein as if set forth at length.

United States Patent Application Publication 20160332922 A1 (the '922 publication), of Tang et al., published Nov. 17, 2016, discloses a coating for CMC comprising SiOC, BMAS, and $SiO_2$. Application is as a slurry. The disclosure of the '922 publication is incorporated by reference in its entirety herein as if set forth at length.

SUMMARY

One aspect of the disclosure involves blade outer air seal comprising at least one internal surface formed within said blade outer air seal; and a layer atop the at least one internal surface comprising a matrix comprising at least one of hafnium silicate ($HfSiO_4$), zirconium silicate ($ZrSiO_4$) and ytterbium disilicate ($Yb_2Si_2O_7$); and barium magnesium alumino silicate (BMAS) and other alkaline earth aluminosilicate.

A further embodiment of any of the foregoing embodiments may additionally and/or alternatively include the at least one internal surface comprises a ceramic matrix composite.

A further embodiment of any of the foregoing embodiments may additionally and/or alternatively include the layer is an outermost layer.

A further embodiment of any of the foregoing embodiments may additionally and/or alternatively include the ceramic matrix composite is a Si/SiC ceramic matrix composite.

A further embodiment of any of the foregoing embodiments may additionally and/or alternatively include the at least one internal surface comprises at least one of a forward internal surface, an aft internal surface and a ramped internal surface.

A further embodiment of any of the foregoing embodiments may additionally and/or alternatively include the layer is an outermost layer.

A further embodiment of any of the foregoing embodiments may additionally and/or alternatively include the layer has a thickness of 0.05 mm to 0.50 mm.

A further embodiment of any of the foregoing embodiments may additionally and/or alternatively include the layer has a BMAS or other alkaline earth aluminosilicate concentration of 0.8% to 10.0% by weight.

A further embodiment of any of the foregoing embodiments may additionally and/or alternatively include a method for using the blade outer air seal, the method comprising exposing the blade outer air seal to a calcium magnesium aluminosilicate (CMAS)-forming environment.

A further embodiment of any of the foregoing embodiments may additionally and/or alternatively include a method for coating a blade outer air seal, the method comprising applying to at least one inner surface of said blade outer air seal a combination of at least one of hafnium oxide ($HfO_2$), zirconium oxide ($ZrO_2$) and ytterbium oxide ($Yb_2O_3$); silicon carbide (SiC); silicon (Si) and barium magnesium aluminosilicate (BMAS) or other alkaline earth aluminosilicate; and heating.

A further embodiment of any of the foregoing embodiments may additionally and/or alternatively include the applying is of one or more slurries.

A further embodiment of any of the foregoing embodiments may additionally and/or alternatively include a weight content of the BMAS or other alkaline earth aluminosilicate relative to total combined $HfO_2$, $Yb_2O_3$, SiC, Si and BMAS or other alkaline earth aluminosilicate in the one or more slurries is 0.8% to 10.0%.

A further embodiment of any of the foregoing embodiments may additionally and/or alternatively include the applying is via ultrasonic spray.

A further embodiment of any of the foregoing embodiments may additionally and/or alternatively include heating is in an oxidizing environment; and the heating is to a peak temperature of at least 1450° C.

BRIEF DESCRIPTION OF THE DRAWINGS

The drawings can be briefly described as follows.

Like reference numbers and designations in the various drawings indicate like elements.

DETAILED DESCRIPTION

Examples are given below of the use of a material comprising a small amount of barium magnesium aluminosilicate (BMAS) in hafnium silicate ($HfSiO_4$) and/or ytterbium disilicate ($Yb_2Si_2O_7$) (hereafter the "BMAS-containing material"). Particular illustrations involve specific use and locations on a blade outer air seal (BOAS) segment whose configuration is drawn from the '268 publication. The material may serve various purposes such as smoothing a rough CMC, acting as a wear coating, acting as a bond coating, acting as an adhesive or cement, acting as a filler, and the like.

Figure 1:
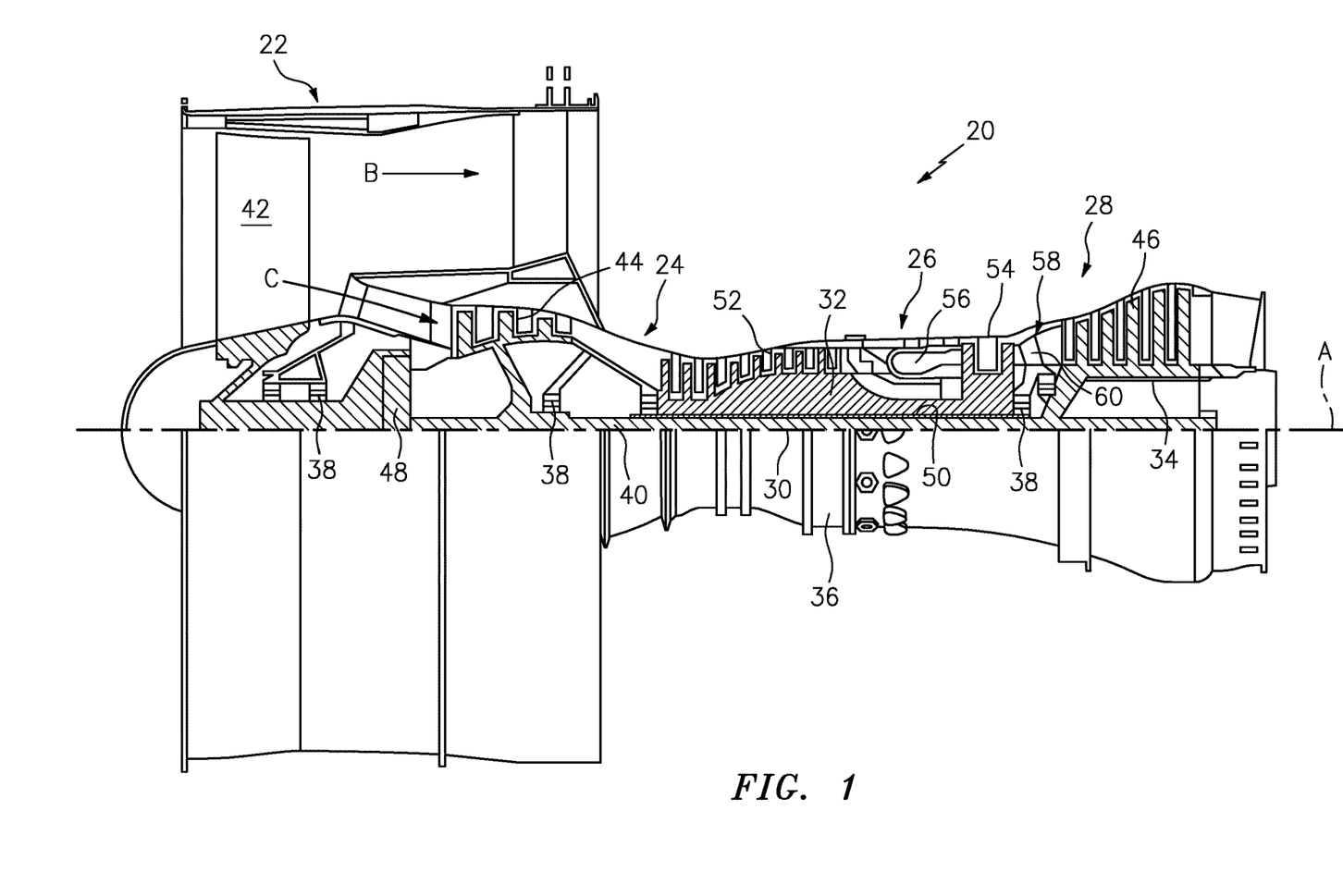
FIG. 1 is a schematic, cross-sectional view of a gas turbine engine.

FIG. 1 schematically illustrates a gas turbine engine 20 that includes a fan section 22, a compressor section 24, a combustor section 26, and a turbine section 28. The exemplary illustrated engine is a two spool engine as discussed below. Alternative engines might include an augmenter section (not shown) among other systems or features. The fan section 22 drives air along a bypass flow path B while the fan section and compressor section 24 drive a core airflow in along a core flow path C where air is compressed and communicated to the combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section. The concepts disclosed herein can further be applied outside of gas turbine engines.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path C and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

Figure 2:
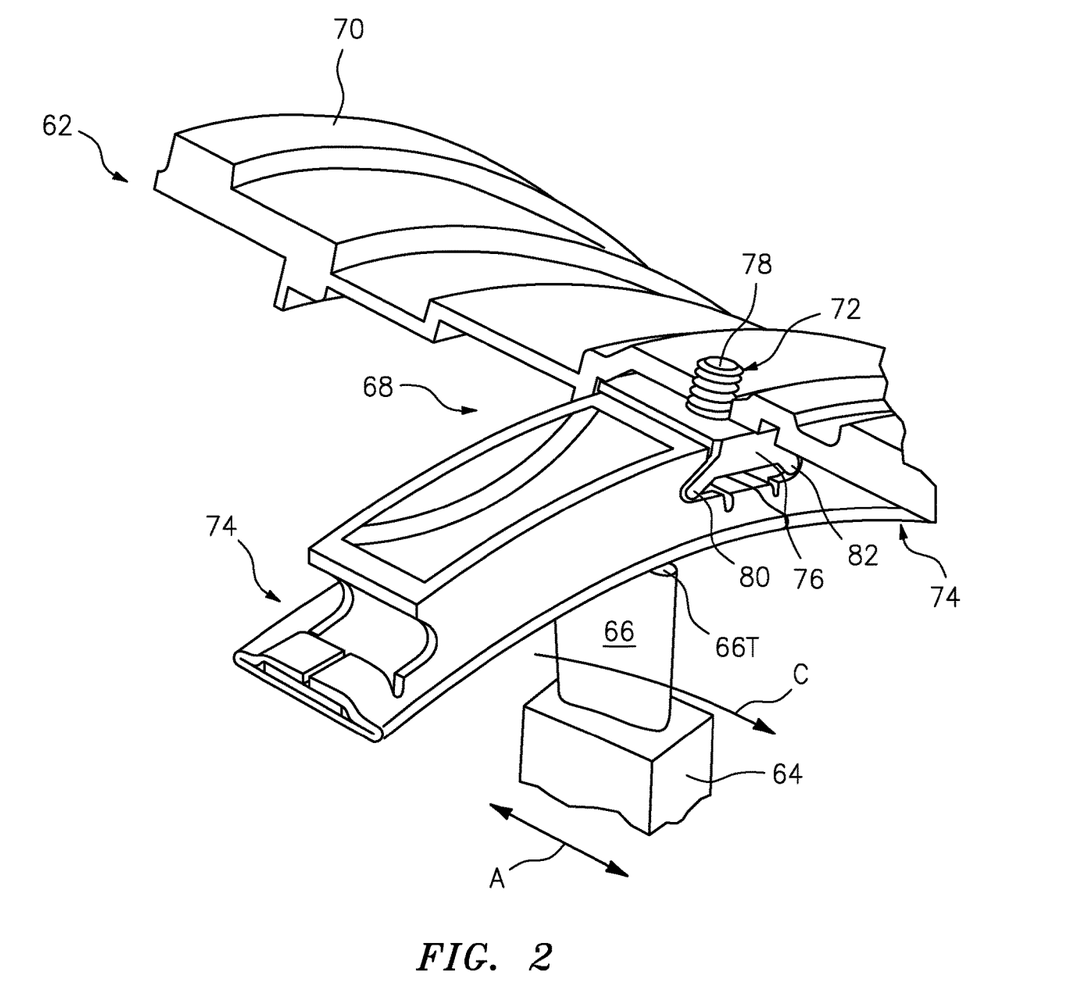
FIG. 2 is a partial view of the engine of FIG. 1.

FIG. 2 is a perspective view of a portion 62 of the gas turbine engine 20 of FIG. 1. In this embodiment, the portion 62 is a portion of the high pressure turbine 54. It should be understood, however, that other portions of the gas turbine engine 20 may benefit from the teachings of this disclosure, including but not limited to the fan section 22, the compressor section 24, and the low pressure turbine 46.

In this embodiment, a rotor disk 64 (only one shown, although multiple disks could be axially disposed within the portion 62) is configured to rotate about the engine central longitudinal axis A. The portion 62 includes an array of rotating blades 66 (only one shown), which are mounted to the rotor disk 64, and arrays of static vane assemblies (not shown) on axial sides of the blades 66.

Each blade 66 includes a blade tip 66T at a radially outermost portion thereof. The rotor disk 64 is arranged such that the blade tips 66T are located adjacent a blade outer air seal (BOAS) assembly 68. The BOAS assembly 68 may find beneficial use in many industries including aerospace, industrial, electricity generation, naval propulsion, pumps for gas in oil transmission, aircraft propulsion, vehicle engines and stationary power plants.

The BOAS assembly 68 is disposed in an annulus radially between an engine case (such as an outer casing 70 of the engine 20) and the blade tips 66T. The BOAS assembly 68 includes a support structure 72 and a plurality of BOAS segments 74. The BOAS segments 74 may be arranged to form a segmented full ring hoop assembly that circumferentially surrounds the associated blades 66, which provides a sealing surface for the blade tips 66T to prevent leakage of the core airflow over to the blades 66. For ease of reference, the individual BOAS segments 74 may be referred to individually as a "BOAS segment" or simply a "BOAS."

Figure 3:
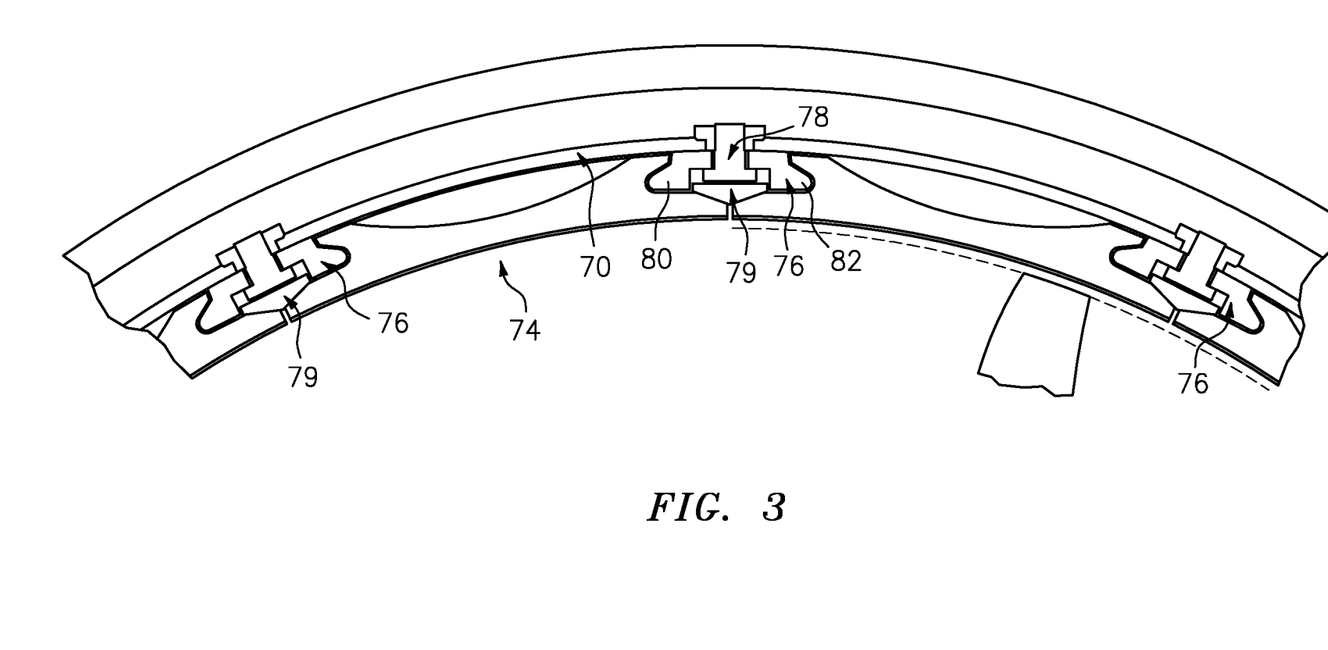
FIG. 3 is a partial longitudinal cutaway view of the engine.

In this example, the support structure 72 includes a retention block 76 fastened to the engine outer casing 70 by a fastener 78. The retention block 76 includes tapered arms 80, 82 on circumferentially opposed sides thereof. The tapered arms 80, 82 in this example are rounded, and are to be received within a corresponding curved end of a respective BOAS segment 74 (as will be explained below). FIG. 3 also shows a wedge seal 79 sealing the inter segment gap and retained in a compartment in the inner diameter (ID) face of the retention block 76.

Figure 4:
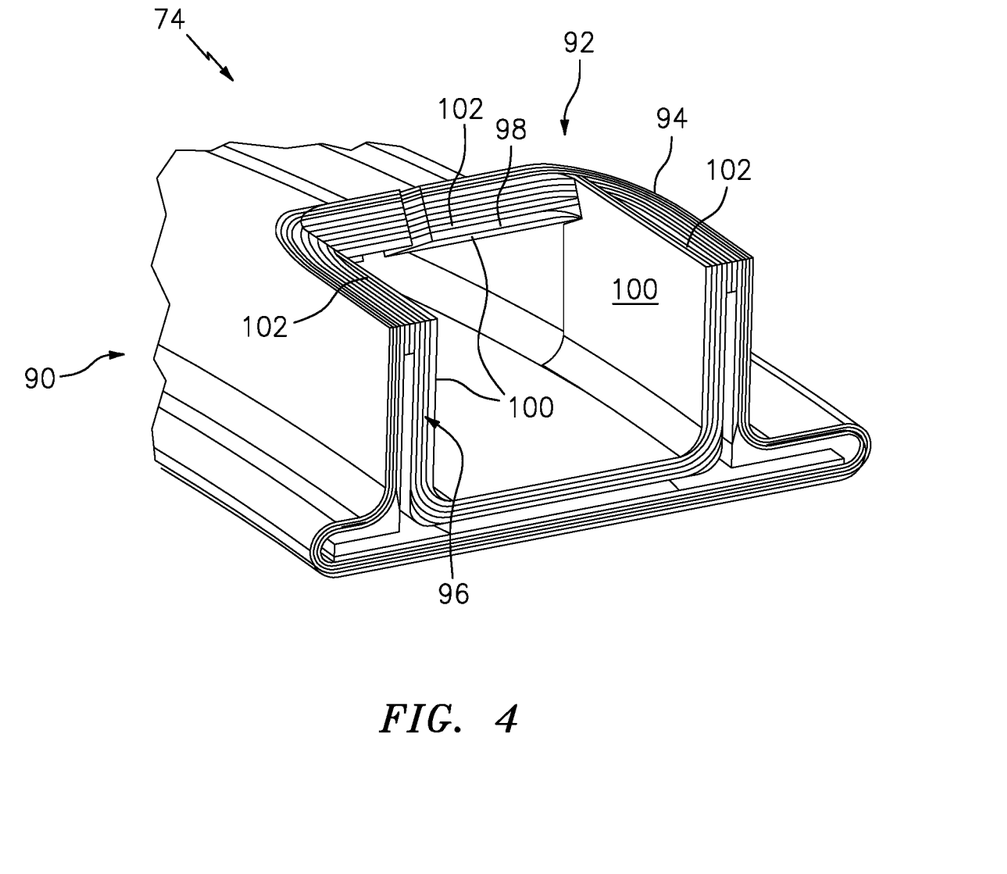
FIG. 4 is a partial cross-sectional view of a blade outer air seal (BOAS) segment.

FIG. 4 illustrates an exemplary BOAS segment 74. In this example, the BOAS segment 74 is primarily made of a ceramic matrix composite (CMC) material. The BOAS segment 74 may include some non-CMC materials, such as for the fillers or spacers, discussed below. CMC materials include a ceramic matrix and a plurality of fibers suspended in that ceramic matrix. The fibers can be a ceramic fibers, silicon carbide fibers, carbon fibers, or metallic fibers, as examples. As is discussed further below, additional fillers may be added in order to reorient plies/layers of the CMC to better resist fracture.

The BOAS segment 74 has a main body portion 90 having internal surfaces 92. The internal surfaces 92 can include a forward internal surface 94, an aft internal surface 96 and a ramped internal surface 98 between the opposed forward internal surface 94 and aft internal surface 96.

The internal surfaces 92 can be covered by or replaced by a layer 100 of the BMAS-containing material. FIG. 4 shows such a layer 100 atop the internal surfaces 92. The layer 100 is an outermost layer. The layer 100 interfaces with the retention block and helps to provide wear resistance and distribute loads. The exemplary layer 100 is formed in situ as a coating. An exemplary thickness is 0.05 mm to 0.50 mm, more specifically, 0.07 mm to 0.15 mm at least locally/peak, optionally feathering or tapering out. Exemplary coating properties may have the coating harder than the CMC to reduce pressure concentrations in the CMC. The coating may be sprayed to a greater thickness and then ground down. An exemplary thickness after being machined down can comprise 0.01 mm to 0.015 mm.

FIG. 4 shows a second layer 102 of the BMAS-containing material. The layer 102 is used as a bondcoat to transition from the CMC to a layer 92.

Exemplary application techniques for the BMAS-containing material involve applying a precursor slurry such as dipping, painting, air spraying, and ultrasonic spraying.

The slurry is a precursor slurry to the extent that it comprises components of the hafnium silicate and/or zirconium silicate and/or ytterbium disilicate which are reacted post spraying. The examples below include the BMAS in the slurry. Exemplary slurries are aqueous slurries where the carrier is distilled or deionized water. The exemplary components for subsequent reacting include silicon and carbon in the form of silicon carbide or silicon along with an oxide of the hafnium or zirconium or ytterbium (respectively hafnium oxide ($HfO_2$) or zirconium oxide ($ZrO_2$) or ytterbium oxide ($Yb_2O_3$). A post spray heating reacts the silicon carbide or silicon with the oxide to form the hafnium silicate and/or zirconium silicate and/or ytterbium disilicate. The heating is performed in an oxidizing atmosphere (e.g., containing pure oxygen, air, or a mixture) to provide the additional required oxygen for the reaction (e.g., $HfO_2 + SiC + 2O_2 \rightarrow HfSiO_4 + CO_2$ or $HfO_2 + Si + 2O_2 \rightarrow HfSiO_4$).

Exemplary post spray heating is to a temperature of about 2700° F. (1482° C.) more broadly, a range may be at least 1350° C.) at least 2500° F. (1371° C.) or at least 1400° C. or at least 1450° C. or an exemplary 2500° F. (1371° C.) to 2700° F. (1482° C.) or 1350° C. to 1500° C. Exemplary time may be at least 12 hours or an exemplary 4-48 hours, more particularly 12-30 hours or about 24 hours.

The slurries may be prepared by mixing powders of the constituents in the carrier liquid. Tables I&II below provide exemplary ranges of constituents.

TABLE I

| Constituent | Powder size | Range 1 Wt % | Range 1 Vol %* | Range 2 Wt % | Range 2 Vol %* | Example 1 Wt % | Example 1 Vol %* | Example 2 Wt % | Example 2 Vol %* | Example 3 Wt % | Example 3 Vol %* |
|---|---|---|---|---|---|---|---|---|---|---|---|
| $HfO_2$ | 1-2 um | 35-60 | 40-60 | 30-70 | 40-80 | 55 | 61 | 49 | 61 | 40 | 45 |
| SiC | 1-2 um | 5-20 | 30-50 | 5-20 | 15-55 | 10 | 35 | 9 | 33 | 15 | 50 |
| BMAS | −325 mesh (<45 um) | 1-10 | 5-20 | 0.1-10 | 1-20 | 1 | 5 | 2 | 10 | 1 | 5 |
| $H_2O$ | N/A | ~40 | 75-85 | ~40 | 75-85 | 46 | 83 | 42 | 80 | 40 | 83 |

*Volume percent of particulates does not include the carrier (water) in the denominator.

TABLE II

| Constituent | Powder size | Range 1 Wt % | Range 1 Vol %* | Range 2 Wt % | Range 2 Vol %* | Example 1 Wt % | Example 1 Vol %* | Example 2 Wt % | Example 2 Vol %* | Example 3 Wt % | Example 3 Vol %* |
|---|---|---|---|---|---|---|---|---|---|---|---|
| $Yb_2O_3$ | 1-2 um | 35-60 | 40-60 | 30-70 | 40-80 | 40 | 45 | 48 | 63 | 56 | 78 |
| SiC | 1-2 um | 5-20 | 30-50 | 5-20 | 15-55 | 15 | 50 | 9 | 33 | 4 | 18 |

TABLE II-continued

| Constituent | Powder size | Range 1 Wt % | Range 1 Vol %* | Range 2 Wt % | Range 2 Vol %* | Example 1 Wt % | Example 1 Vol %* | Example 2 Wt % | Example 2 Vol %* | Example 3 Wt % | Example 3 Vol %* |
|---|---|---|---|---|---|---|---|---|---|---|---|
| BMAS | −325 mesh (<45 um) | 1-10 | 5-20 | 0.1-10 | 1-20 | 1 | 5 | 1 | 5 | 1 | 5 |
| $H_2O$ | N/A | ~40 | 75-85 | ~40 | 75-85 | 46 | 83 | 42 | 80 | 40 | 83 |

*Volume percent of particulates does not include the carrier (water) in the denominator Table III below shows test data discussed below. Cracking and delamination are observed at at high ratio of Yb to Si. Some cracking but no significant delamination occurred at lesser ratio and it is believed this may be ameliorated via variation in coating thickness. Coatings were about 300-400 micrometers.

TABLE III

|  | Test 1 | Test 2 | Test 3 | Test 4 | Test 6 |
|---|---|---|---|---|---|
| Reactive element (RE) | Hf | Hf | Yb | Yb | Yb |
| Molar RE/Si | 0.5 | 1.0 | 1.0 | 2.6 | 0.5 |
| Wt. % BMAS | 7 | 5 | 5 | 5 | 5 |
| Result | No cracking or delamination | Cracking and no delamination | No cracking or delamination | Cracking and delamination | Cracking and no delamination |

Exemplary molar ranges of Hf, Yb, or their combination to Si are 0.5-2.0, more particularly 0.5-1.5.

Exemplary application is via AccuMist™ Spray Shaping System of Sono-Tek Corporation, Milton N.Y.

In an exemplary test for resistance to calcium magnesium aluminosilicate (CMAS) attack, a sample of the coating material on a CMC substrate was prepared by initially marking out a 1 cm by 1 cm square on the coating and applying 0.010 g of CMAS powder via sprinkling onto that marked area. A spatula was used to spread the powder over the area and then 2-5 drops of isopropanol was applied to the powder (until powder appeared fully wetted). The spatula was used to mix and evenly distribute the CMAS-isopropanol slurry.

The sample was allowed to air dry for a few minutes and then placed in a crucible and covered. The crucible is placed in a furnace and heated at a desired temperature (2700 F in the tests) for a desired time (100 hours).

The post heating samples were observes to detect the presence of spalling (Table III above).

The results for the examples above were that a beneficial range of BMAS is 1.0% to 10.0%, more particularly, 1.0% to 8.0% or 2.0% to 7.0%. Lower amounts are believed to hinder densification, exposing the substrate to greater oxidation and exposing the coating to greater CMAS infiltration; greater amounts are believed to increase chances of adverse reaction between the BMAS and the Silicon carbide of the substrate.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A blade outer air seal comprising:
   at least one internal surface formed within said blade outer air seal; and
   a layer atop the at least one internal surface, the layer is an outermost layer comprising:
   a matrix comprising at least one of hafnium silicate ($HfSiO_4$), zirconium silicate ($ZrSiO_4$), and ytterbium disilicate ($Yb_2Si_2O_7$); and
   barium magnesium alumino silicate (BMAS) or other alkaline earth aluminosilicate.

2. The blade outer air seal of claim 1 wherein:
   the at least one internal surface comprises a ceramic matrix composite.

3. The blade outer air seal of claim 2 wherein:
   the ceramic matrix composite is a Si/SiC ceramic matrix composite.

4. The blade outer air seal of claim 1 wherein:
   the at least one internal surface comprises at least one of a forward internal surface, an aft internal surface and a ramped internal surface.

5. The blade outer air seal of claim 1 wherein:
   the layer has a thickness of 0.05 mm to 0.50 mm.

6. The blade outer air seal of claim 1 wherein:
   the layer has a BMAS or other alkaline earth aluminosilicate concentration of 0.8% to 10.0% by weight.

7. A gas turbine engine including the blade outer air seal of claim 1.

8. A method for using the blade outer air seal of claim 1, the method comprising:

exposing the blade outer air seal to a calcium magnesium aluminosilicate (CMAS)-forming environment.

9. A blade outer air seal comprising:
at least one internal surface formed within said blade outer air seal; and
a layer atop the at least one internal surface comprising:
a matrix comprising at least one of hafnium silicate ($HfSiO_4$), zirconium silicate ($ZrSiO_4$), and ytterbium disilicate ($Yb_2Si_2O_7$); and
barium magnesium alumino silicate (BMAS) or other alkaline earth aluminosilicate including a concentration of 0.8% to 10.0% by weight.

10. The blade outer air seal of claim 9 wherein:
the at least one internal surface comprises a ceramic matrix composite.

11. The blade outer air seal of claim 10 wherein:
the ceramic matrix composite is a Si/SiC ceramic matrix composite.

12. The blade outer air seal of claim 9 wherein:
the at least one internal surface comprises at least one of a forward internal surface, an aft internal surface and a ramped internal surface.

13. The blade outer air seal of claim 9 wherein:
the layer is an outermost layer.

14. The blade outer air seal of claim 9 wherein:
the layer has a thickness of 0.05 mm to 0.50 mm.

\* \* \* \* \*